US009602926B1

(12) United States Patent
Keen et al.

(10) Patent No.: US 9,602,926 B1
(45) Date of Patent: Mar. 21, 2017

(54) SPATIAL PLACEMENT OF AUDIO AND VIDEO STREAMS IN A DYNAMIC AUDIO VIDEO DISPLAY DEVICE

(71) Applicant: International Business Machines Corporation, Armonk, NY (US)

(72) Inventors: Martin G. Keen, Cary, NC (US); David B. Lection, Raleigh, NC (US); Sarbajit K. Rakshit, Kolkata (IN); John D. Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/994,467

(22) Filed: Jan. 13, 2016

(51) Int. Cl.

| | |
|---|---|
| ***G06F 17/00*** | (2006.01) |
| ***H04R 5/02*** | (2006.01) |
| ***H04R 7/26*** | (2006.01) |
| ***H04R 9/06*** | (2006.01) |
| ***H04R 1/32*** | (2006.01) |

(52) U.S. Cl.
CPC ............... *H04R 5/02* (2013.01); *H04R 1/323* (2013.01); *H04R 7/26* (2013.01); *H04R 9/063* (2013.01); *H04R 2499/15* (2013.01)

(58) Field of Classification Search
CPC ... F25D 23/04; F25D 25/005; H04N 21/4122; H04N 21/41407; H04N 21/43615; H04N 21/43637; H04W 4/008; H04S 7/30; H04S 2400/11; H04S 2420/01; H04S 2420/03; H04S 7/301; H04R 2227/003; H04R 5/02
See application file for complete search history.

(56) References Cited

U.S. PATENT DOCUMENTS

| | | | | |
|---|---|---|---|---|
| 5,448,647 | A * | 9/1995 | Koizumi | H04N 5/642 348/E5.13 |
| 8,269,902 | B2 | 9/2012 | Plut | |
| 8,274,611 | B2 | 9/2012 | Demartin et al. | |
| 8,751,192 | B2 | 6/2014 | Schulz et al. | |
| 2006/0256983 | A1* | 11/2006 | Kenoyer | H04N 7/14 381/122 |
| 2012/0229589 | A1 | 9/2012 | Barrus | |
| 2013/0129103 | A1* | 5/2013 | Donaldson | G10K 11/16 381/71.1 |

(Continued)

OTHER PUBLICATIONS

D'Arca, E. , et al.,"Look Who's Talking: Detecting the Dominant Speaker in a Cluttered Scenario", Acousticws, Speech and Signal Processing (ICASSP), IEEE International Conference, May 4-9, 2014, pp. 1-5.

(Continued)

*Primary Examiner* — Fan Tsang
*Assistant Examiner* — Eugene Zhao
(74) *Attorney, Agent, or Firm* — Cantor Colburn LLP

(57) ABSTRACT

A system includes a video display screen configured to display selected portions of video content on a main portion of the video display screen and on one or more extended portions of the video display screen. The system also includes an audio portion configured to dynamically create one or more sound radiating speaker elements at one or more spatially selected locations with respect to the displayed selected portions of the video content. A method is also provided that provides the video display screen and the audio portion of the system.

17 Claims, 10 Drawing Sheets

(56) References Cited

U.S. PATENT DOCUMENTS

| | | | | |
|---|---|---|---|---|
| 2013/0278631 | A1* | 10/2013 | Border | G02B 27/017 345/633 |
| 2011/3030093 | | 11/2013 | Chou et al. | |
| 2014/0022331 | A1* | 1/2014 | Bansal | H04N 7/142 348/14.07 |
| 2015/0023524 | A1* | 1/2015 | Shigenaga | H04R 1/326 381/92 |
| 2015/0050967 | A1 | 2/2015 | Bao et al. | |
| 2015/0078594 | A1 | 3/2015 | McGrath et al. | |
| 2015/0117650 | A1 | 4/2015 | Jo et al. | |
| 2015/0131966 | A1 | 5/2015 | Zurek et al. | |
| 2015/0195612 | A1 | 7/2015 | Liu et al. | |
| 2015/0223002 | A1 | 8/2015 | Mehta et al. | |
| 2016/0133154 | A1* | 5/2016 | Cortes | G09B 5/065 434/157 |
| 2016/0142674 | A1* | 5/2016 | Travis | H04N 7/15 348/14.07 |

OTHER PUBLICATIONS

Bost, X. , et al.,"Audiovisual Speaker Diarization of TV Series", IEEE International Conference, Acoustics, Speech and Signal Processing, Apr. 19-24, 2015, pp. 1-5.

List of IBM Patents or Patent Applications Treated as Related; (Appendix P), Filed: Jan. 13, 2016, pp. 2 pgs.

Martin G. Keen, et al., Pending U.S. Appl. No. 14/994,449 entitled "Analog Area Speaker Panel With Precision Placement and Direction of Audio Radiation," filed with the U.S. Patent and Trademark Office on Jan. 13, 2016.

* cited by examiner

SPATIAL PLACEMENT OF AUDIO AND VIDEO STREAMS IN A DYNAMIC AUDIO VIDEO DISPLAY DEVICE

BACKGROUND

The present invention relates to the presentation of audio and video content, and more specifically, to providing relatively more accurate spatial placement of certain portions of both audio and video content within an overall audio and video presentation.

Many movies and high definition ("HD") video content programs, whether being shown in a movie theater or in the home, are typically displayed on a single two-dimensional viewing screen in a 16:9 aspect ratio. For example, 1080P video is displayed at a resolution of 1920 pixels in the X direction and 1080 pixels in the Y direction.

However, opportunities exist for presenting at least portions of both the video and audio content of a movie and/or program in an enhanced spatial manner.

Audio reproduction systems have evolved relatively significantly over the years from a single speaker system that produced monaural sound, to a pair of speakers that produced stereo sound, to quadraphonic audio speaker systems, to the present-day 5.1 and 11.2 speaker arrangements. The constant driving force has been to more accurately reproduce sound in a spatial manner.

SUMMARY

According to an embodiment of the present invention, a system includes a video display screen configured to display selected portions of video content on a main portion of the video display screen and on one or more extended portions of the video display screen. The system also includes an audio portion configured to dynamically create one or more sound radiating speaker elements at one or more spatially selected locations with respect to the displayed selected portions of the video content.

According to another embodiment of the present invention, a method includes providing a video display screen configured to display selected portions of video content on a main portion of the video display screen and on one or more extended portions of the video display screen. The method also includes providing an audio portion configured to dynamically create one or more sound radiating speaker elements at one or more spatially selected locations with respect to the displayed selected portions of the video content.

According to yet another embodiment of the present invention, a system includes a video display screen configured to display a selected portion of video content on a main portion of the video display screen and at least one extended portion of the video display screen. The system also includes an audio subsystem configured to dynamically create at least one sound radiating speaker element at a spatially selected location with respect to the displayed selected portion of the video content.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3, including

FIG. 8, including

DETAILED DESCRIPTION

Typical modern audio speakers contain three primary components that together generate the audio sound from the speaker: a magnet, a voice coil, and a cone. The coil is attached to the cone, which is in proximity to the magnet. The coil, when energized with electrical current, vibrates which, in turn, causes the cone to vibrate and produce audio sound.

Traditional audio speakers are typically statically mounted in place (i.e., they do not move unless the user physically moves them to another location), when these speakers reproduce audio at a particular location in a room (i.e., not at a speaker location per se, but a location such as where a listener is located), the sound reproduction is only approximate. This is because the audio reproduction is based on the distance of the speaker to the specific location in the room, and on the proximity of the one or more speakers to that location.

Also, typical modern speaker systems require a relatively large number of speakers (i.e., six speakers for a "5.1" speaker system, and thirteen speakers for an "11.2" speaker system) to be statically mounted. This involves detailed wiring or wireless placement of the individual or separate speakers in an attempt to achieve a desired sound quality. In addition, when upgrading the speaker system to a newer system (e.g., theoretically a "13.3" system), this requires adding two more separate speakers and a separate subwoofer to an existing "11.2" system, and also rewiring and/or repositioning some or all of the speakers to accommodate the new spatial distribution of the speakers in an attempt to achieve a desired sound quality.

In contrast, in embodiments of the present invention, the analog area speaker ("AAS") contains somewhat similar functional elements as the typical modern speaker mentioned hereinabove. However, in accordance with embodiments of the present invention and as described and illustrated in more detail hereinafter, the elements of the analog area speaker are formed dynamically within some defined physical area on or within a panel such that the speaker so formed is not limited per se to a fixed spatial location within the defined physical area in a manner hereinbefore described with respect to the typical modern speaker.

Figure 1:
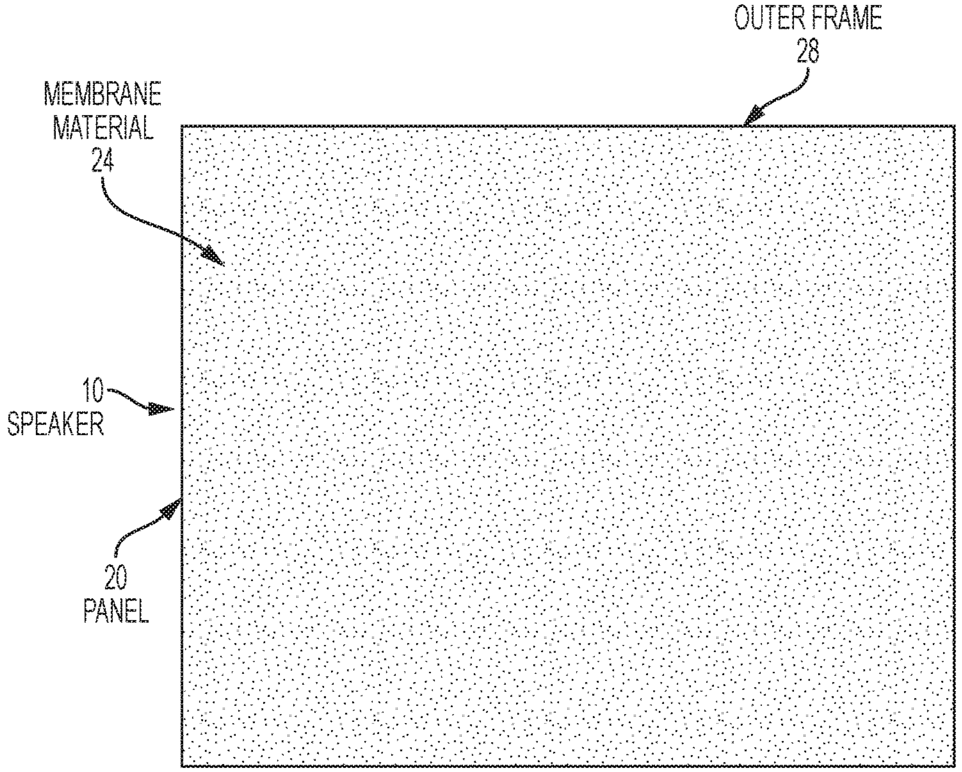
FIG. 1 is a front view of a panel portion of an analog area speaker in accordance with an embodiment of the present invention.

With reference now to FIG. 1, there illustrated is an analog area speaker 10 of various embodiments of the present invention. The AAS 10 may comprise a panel or wall element 20. The AAS panel 20 may comprise a generally flat sheet of membrane material 24 surrounded or enclosed (at least in part) by an outer frame 28. In embodiments of the present invention, the panel 20 may be of any shape; for example, square, rectangular, or circular. The panel 20 may also be oriented entirely vertically within a physical spatial location (e.g., a room in a house), or it may be at some other spatial orientation, such as tilted at an angle with respect to a vertical axis. The panel 20 may also be of any desired size; for example, the panel 20 may occupy a small portion (e.g., two feet by two feet) of a room or the panel 20 may occupy an entire wall of a room. Also, more than one AAS 10 may be located in a single room (e.g., on opposite or perpendicular walls) or in other spatial areas. As described in detail hereinafter with respect to FIG. 5, a controller 80 may be used to control a single AAS 10, or the controller 80 may control more than one AAS 10.

In accordance with embodiments of the present invention, the membrane material 24 comprising the AAS panel 20 may be a stretchable or flexible membrane material such as a polyester sheet or plastic film (e.g., Mylar®). As described and illustrated in more detail hereinafter, the type of material selected for the panel membrane material 24 may be based on its ability to deform by a suitable amount due to a pressure applied to the membrane material 24 at particular locations thereof. This deformation by an applied pressure is what dynamically forms a radiating speaker element in accordance with the analog area speaker of embodiments of the present invention.

The outer frame 28 may comprise any suitable type of rigid material, such as wood, metal, plastic, etc. The primary function of the outer frame 28 is to hold the membrane material 24 of the panel 20 securely in place during the deformations that take place within the membrane material 24 when radiating speaker elements are formed in a dynamic manner, in accordance with embodiments of the present invention.

Figure 2:
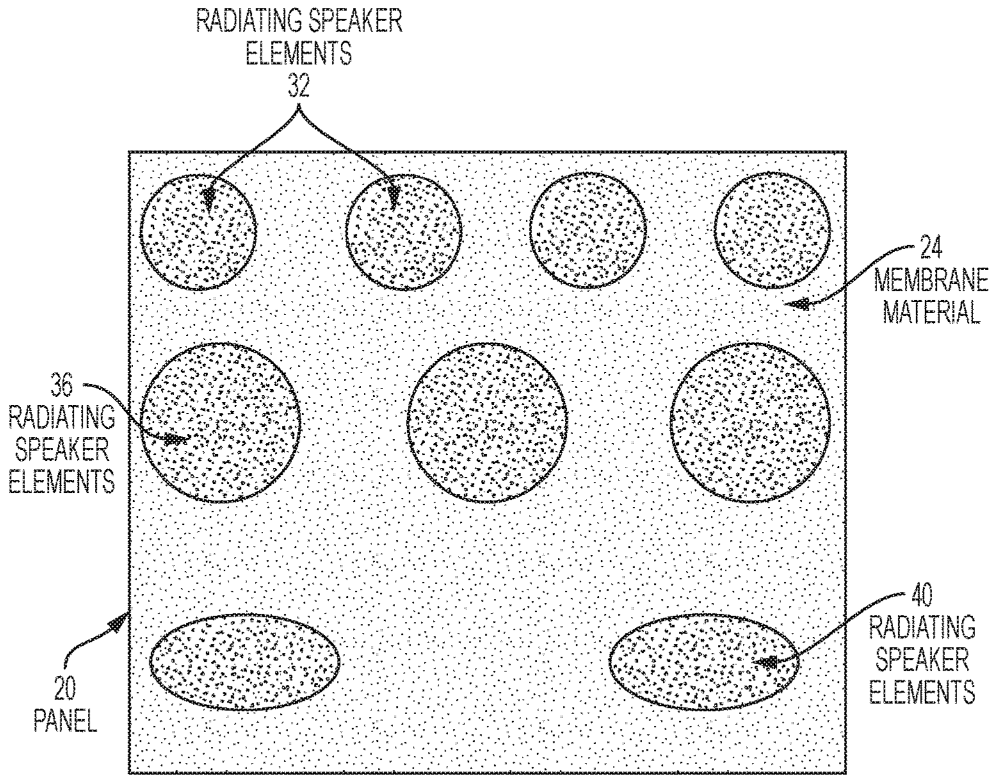
FIG. 2 is a front view of the panel portion of FIG. 1 having a number of radiating speaker elements formed therein in accordance with an embodiment of the present invention.

In FIG. 2 is illustrated a front view of the panel 20 of the AAS 10 of FIG. 1 having circular elements 32, larger circular elements 36, and oval elements 40 dynamically formed in the panel's membrane material 24 within corresponding horizontal rows in accordance with an embodiment of the present invention. As will be discussed in detail hereinafter, the RSE's 32, 36, 40 are formed in the membrane material 24 by deformations of the material 24 in select locations by applying pressure to the membrane 24 in those select locations.

It should be understood that the shapes and sizes of the RSE's 32, 36, 40 shown in FIG. 2 are purely exemplary. The RSE's may take on any suitable shape and/or size in light of the teachings herein. Also, all of the RSE's 32, 36, 40 formed in the AAS panel 20 may have the same shape and size, or may have any number of different shapes and/or sizes formed in the panel 20. In accordance with embodiments of the present invention, at any given moment in time the number of RSE's dynamically formed, and their size, shape and location on the panel 20 may be based primarily on the audio sound spatial field desired to be produced or rendered by the RSE's 32, 36, 40 within the spatial location of the AAS 10 in the room or other area in which the AAS 10 is located.

Figure 3B:
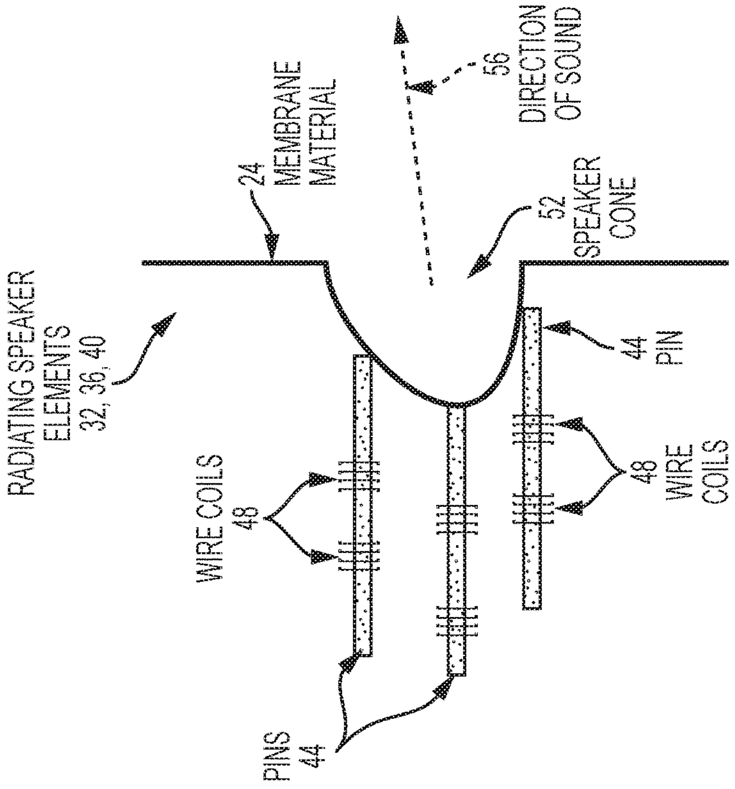
FIGS. 3A and 3B, show side views of two different embodiments of a radiating speaker element in accordance with the present invention.
Figure 3A:
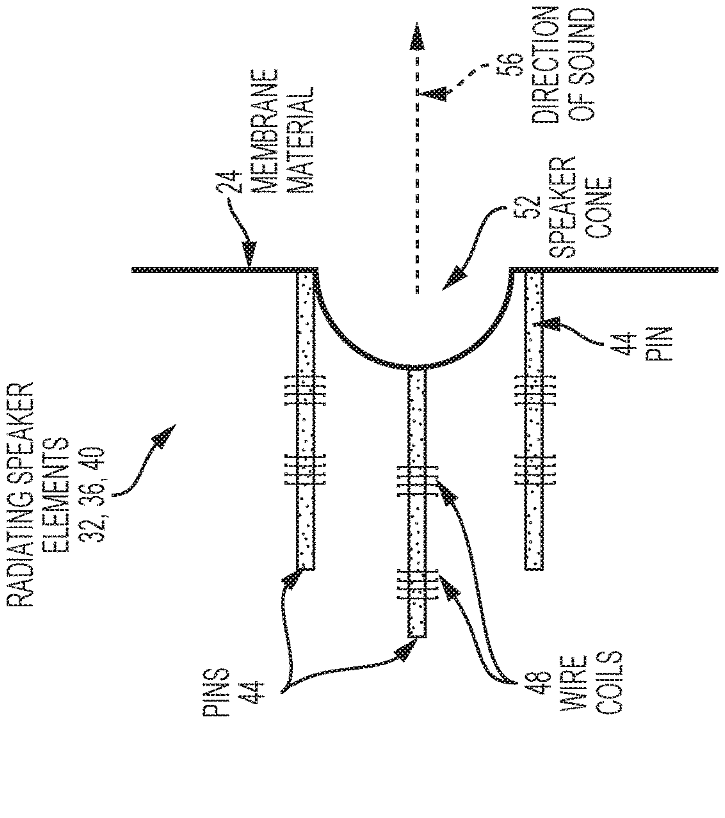

Referring now to FIG. 3A, there illustrated is a side view of a radiating speaker element ("RSE") 32, 36, 40 in accordance with embodiments of the present invention. Typically an analog area speaker ("AAS") 10 of embodiments of the present invention will have a plurality of similar such RSE's that may be arranged in a grid-like, two-dimensional pattern (i.e., rows and columns) within the AAS panel 20. In the alternative, the plurality of RSE's may be arranged randomly throughout the AAS panel 20.

Each RSE 32, 36, 40 may have three movable actuator or driver pins 44 located behind or to the left side of the membrane 24 and disposed perpendicular thereto, as shown in FIGS. 3A and 3B. However, it is to be understood that each RSE may have at least one pin 44 associated with it, or may have any number of pins 44 greater than one associated with it. Each actuator or driver pin 44 may comprise a ferrous magnetic material, or other suitable material. One end of each pin 44 is connected to the left side of the membrane 24. In addition, each pin 44 has an electrically actuated coil of wire 48 wrapped or disposed around at least a portion of the pin 44. Electrical current flows through selected ones of the wire coils 48 at various times. The electrically actuated wire coils 48 thereby form electromagnets. When energized, the electromagnetic coils 48 cause actuation or "driving" movement of the corresponding pins 44; for example, linearly, to the left (i.e., pulling or negative movement) or the right (i.e., pushing or positive movement) in FIGS. 3A and 3B. Such movement of the pins 44 causes the portion of the membrane 24 connected to the corresponding moving pin 44 to deform either inward (i.e., pulled to the left in FIGS. 3A and 3B) or outward (i.e., pushed to the right in FIGS. 3A and 3B). Note that the movement of the actuator or driver pins 44 may be something other than linear.

Thus, by moving (i.e., modulating) the actuator pin 44 in the center of either FIG. 3A or FIG. 3B back and forth (i.e., the center pin 44 is located in between the two other pins 44 that flank the center pin 44 on either side), a speaker cone 52 is dynamically formed at any desired instant in time within the membrane material 24 at the location of this center pin 44. Sound can then be reproduced by such a moving cone (i.e., transducer) 52 at the dynamic location on the AAS panel 20.

Also, while a center actuator "driver" pin 44 is being actuated while dynamically forming an RSE, the other two actuator pins 44 flanking the center "driver" actuator pin 44 may be held in place by a biasing voltage. That way the two outer flanking actuator pins 44 help to "frame" or "fix" the outer rim of the cone of the dynamically formed radiating speaker element. Further, in various embodiments of the present invention, if two outer or flanking "fixing" actuator pins 44 are utilized with a center "driver" actuator pin 44, then a cone with an approximate rectangular shape may be formed in the membrane material 24 on the AAS panel 20. The rectangular shaped cone may have different characteristics (e.g., produces relatively more directional sound). Typically, the greater number of outer or "fixing" actuator pins 44 used to dynamically form the radiating speaker element, then the relatively more "open" the cone may be. Thus, a relatively wider sound dispersal may be achieved.

Relatively larger cones 52 may be dynamically formed for reproducing lower frequencies (e.g., a subwoofer), while relatively smaller cones 52 may be dynamically formed for reproducing higher frequencies. The lines 56 with the arrowheads in FIGS. 3A and 3B indicate the direction of the sound as radiates out from the dynamically formed speaker cones 52. FIG. 3A illustrates the sound coming out of the cone 52 in essentially a horizontal direction (i.e., essentially perpendicular to the plane of the membrane material 24). This is accomplished by not only moving the center actuator pin 44 as described, but also by keeping the two pins 44 that flank the center pin stationary (e.g., by an applied biasing voltage), thereby keeping the membrane material 24 stationary at the locations of the outer two flanking pins.

In the embodiment of the RSE 32, 36, 40 of FIG. 3B, all three of the pins 44, or at least two of the pins 44, are caused to move as described hereinabove (i.e., by electrically actuating their corresponding wire coils 48). The pins 44 may be caused to move at differing linear amounts. In the embodiment shown in FIG. 3B, the upper pin 44 moves inward to a relatively greater extent than the lower pin 44. This causes the sound coming out of the cone 52 to be angled or skewed upward, as indicated by the line 56 with the arrowhead in FIG. 3B.

In alternatives, the sound coming out of any one of the cones 52 may be aimed in any conical position from the front of the membrane 24. The conical position may be typically limited in practice by the available amount of linear travel of the pins 44 associated with the cone 52. Thus, by selectively actuating one or more of the pins 44 associated with a dynamically formed RSE at varying amounts of linear travel, the spatial direction of the sound emanating from the RSE can be made to vary relatively precisely. That way a user of the AAS 10 of embodiments of the present invention may specifically direct the desired locations of the sound within the room or other spatial area in which the AAS 10 is located.

In light of the foregoing, the circles 32, 36 and the ovals 40 shown in FIG. 2 mark the locations on the membrane material 24 on the AAS panel 20 where the speaker cones may be dynamically formed at varying instances in time in accordance with embodiments of the present invention. More specifically, in accordance with embodiments of the present invention, at any instant in time one or more of the RSE's may be dynamically formed to produce audio sound. Then at another instant in time, one or more of the same RSE's and/or different RSE's may be dynamically formed, with possibly differing sizes of the RSE's, thereby producing differing frequencies of sound at varying locations within the AAS panel 20. In essence, the audio sound field created by the AAS 10 may be moved over time to varying locations within the AAS panel 20.

Figure 4:
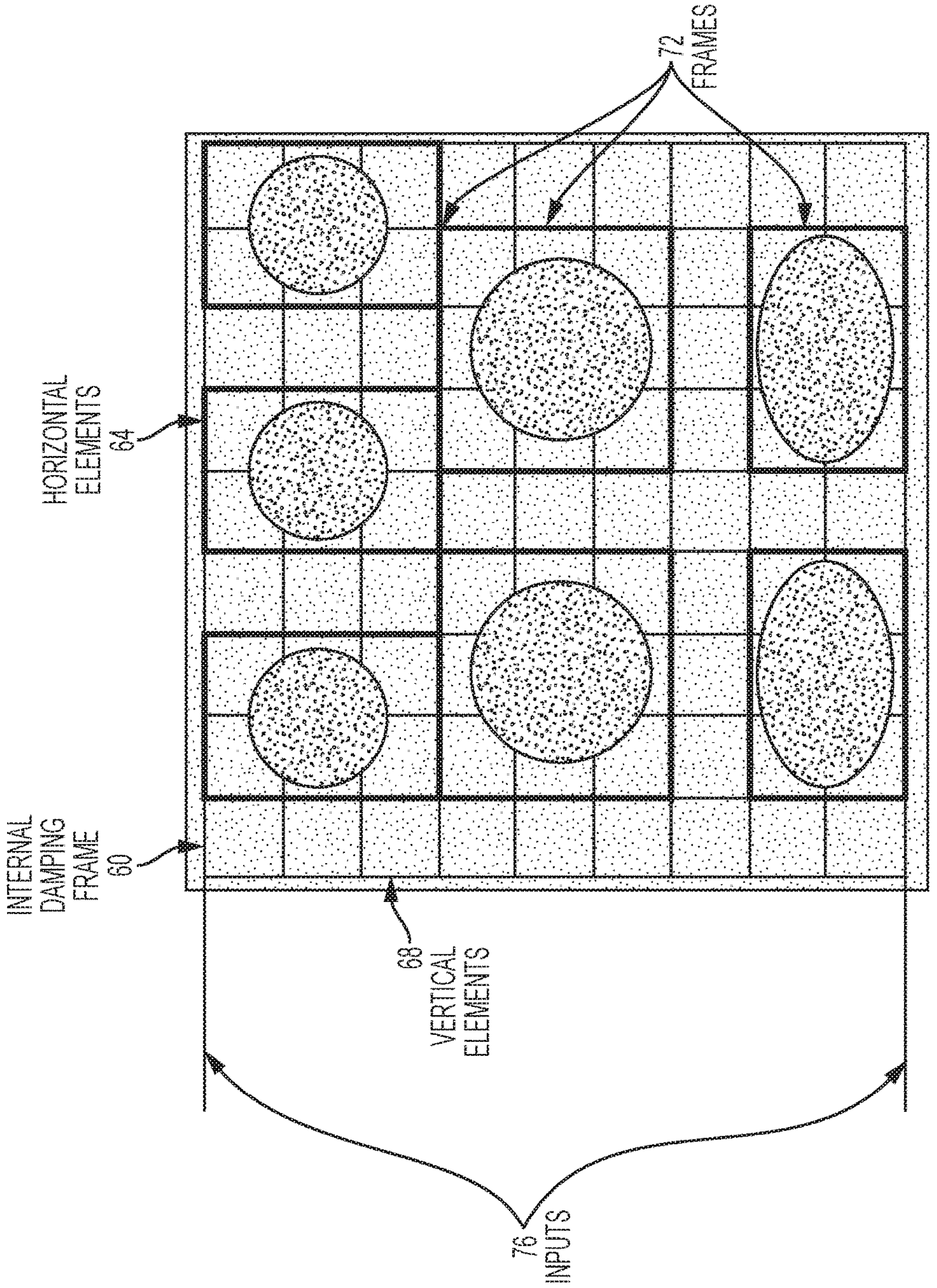
FIG. 4 is a front view of the analog area speaker of FIG. 1 having an internal frame in accordance with an embodiment of the present invention.

Referring now to FIG. 4, there illustrated is the AAS panel 20 having an additional internal damping frame 60. The purposed of the damping frame 60 is to provide damping or prevention of any audio crosstalk between the dynamically formed radiating speaker elements ("RSE's") 32, 36, 40 in the AAS panel 20.

In embodiments of the present invention, the internal damping frame 60 may comprise a two-dimensional grid-like structure comprising a number of both horizontal elements 64 and vertical elements 68, as shown in FIG. 4. However, it is to be understood that arranging the elements 64, 68 horizontally and vertically is purely exemplary. Other arrangements of the elements 64, 68 (e.g., angular) are possible. The horizontal and vertical elements 64, 68 may comprise enclosed channels that contain microfluids, wherein the enclosed channels 64, 68 may be selectively pressurized by pressurizing the microfluids therein. The enclosed channels 64, 68 of the internal damping frame 60 may be formed integral with the membrane material 24, for example, next to a surface of the membrane material 24 (e.g., the same surface or side of the membrane material that the pins 44 are in contact with), between layers of the membrane material 24, or inside or within the membrane material 24. It suffices that the enclosed channels 64, 68 are disposed in proximity to the membrane material 24.

Portions of the channels may be selectively pressurized in the form of a frame 72 or relatively rigid border surrounding an RSE that is dynamically formed at the same time. Each frame 72 may be formed by selectively opening and closing valves located within the frame 60 at the intersections of the horizontal and vertical channels 64, 68. In the alternative, the valves may be located elsewhere with respect to the channels 64, 68. The channels 64, 68 may be selectively pressurized by providing a fluid pressure across the inputs 76 of the internal damping frame 60. This fluid pressure may be applied by any type of pressurizing device (not shown).

When the channels 64, 68 are selectively pressurized to form the damping frames 72, the frames stiffen the membrane material 24 at its edges, thereby damping the propagation of vibrations from the dynamically formed RSE. Thus, at the same time that an RSE 32, 36, 40 is dynamically formed in the AAS 10, a pressurized frame 72 is also dynamically formed in the AAS 10. FIG. 4 illustrates a number of such frames 72.

In other embodiments of the present invention, instead of the internal damping frame 60 comprising the fluidic channels 64, 68 and associated hardware (e.g., valves, applied input pressure), an electroactive polymer material (either of the dielectric type or the ionic type) may be utilized as part of the internal damping frame 60. Specifically, at the locations of the fluidic channels in the grid of the internal damping frame 60, strips of the electroactive polymer material may instead be attached to the membrane material 24 (e.g., polyester or plastic film). A voltage may then be applied to the portions of the strips of electroactive polymer material at which it is desired to form a frame around an RSE 32, 36, 40. The applied voltage causes the electroactive polymer material in the strips to become rigid or stiffen, which results in a frame 72 surrounding the RSE, in a manner similar to the frames 72 formed by the microfluidic channels discussed hereinabove. The voltage may be applied by a voltage device (not shown) at the inputs 76 of the internal damping frame, similar to the microfluid channel embodiment discussed above in which a fluid was applied across the inputs 76 of the internal damping frame 60. In the alternative, the voltage may be selectively applied directly to the portions of the strips of electroactive polymer material instead of at the inputs 76 of the internal damping frame 60.

Figure 5:
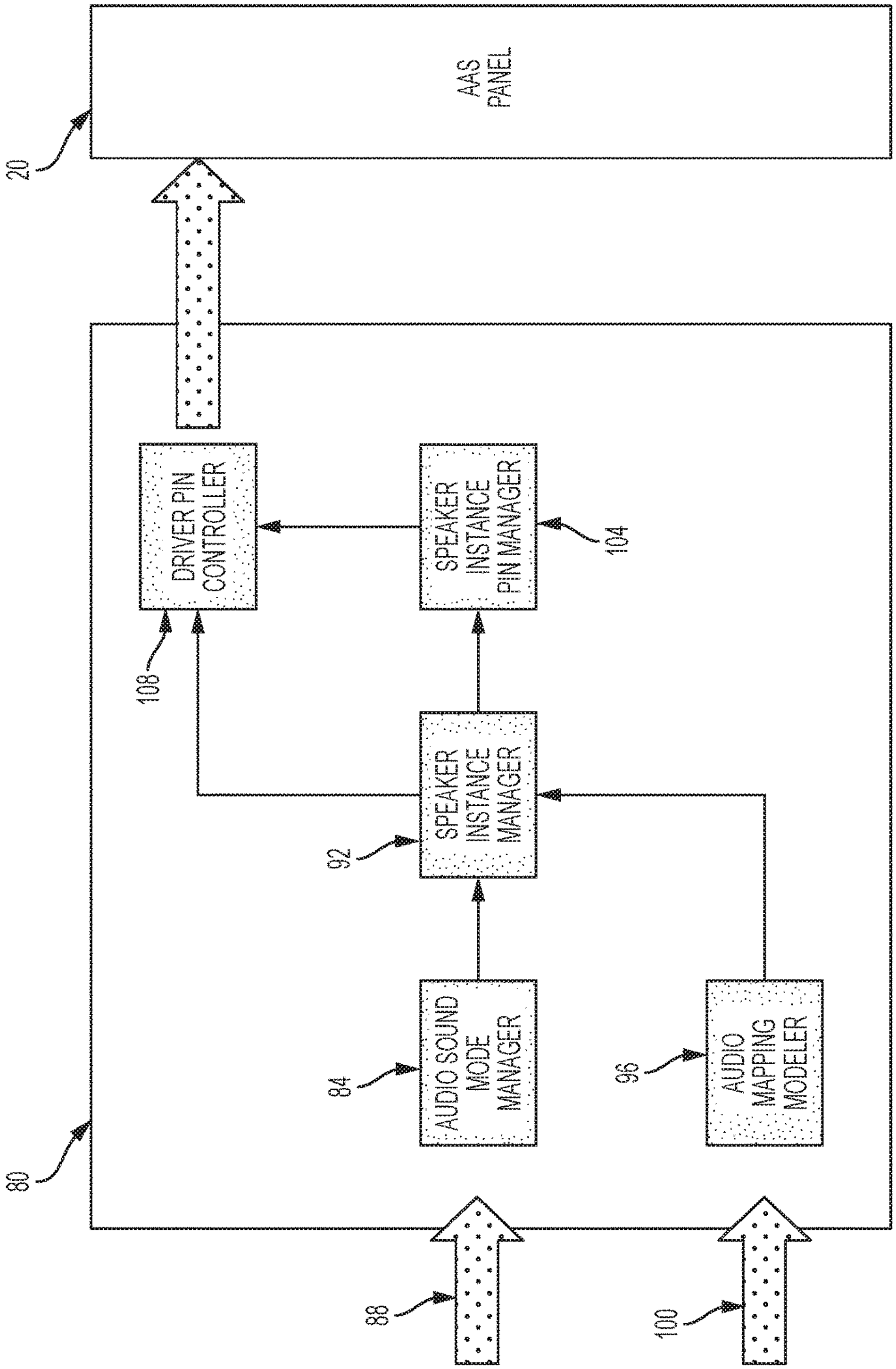
FIG. 5 is a block diagram of a controller for the analog area speaker of FIG. 1 in accordance with an embodiment of the present invention.

Referring now to FIG. 5, there illustrated is a block diagram of a controller 80 for the analog area speaker 10 of FIG. 1 in accordance with an embodiment of the present invention. The controller 80 may form a part of the analog area speaker 10 in that the controller 80 may be physically located at, on, or within the analog area speaker 10. In the alternative, the controller 80 may be located separate and apart from the AAS 10. Further, in various embodiments, the controller 80 may comprise electronic and/or electrical components, such as, for example, one or more processors that are wired or programmed to control the sound provided by the AAS 10.

In accordance with embodiments of the present invention, the controller 80 may be utilized with one or more analog area speakers 10. For example, in an embodiment using two AAS's 10 (one AAS 10 located in the front of a room and another AAS 10 located in the back of a room), the controller 80 may map a "5.1" audio signal by providing the left front, right front and center speakers on one AAS 10, and the left rear, right rear and sub-woofer on the other AAS 10. This setup is purely exemplary, and somewhat "mirrors" how someone would place traditional "static" speakers within a room to achieve a "5.1" setup. Note that with the AAS 10 of embodiments of the present invention, a user can precisely dynamically locate a radiating speaker element ("RSE") on an AAS panel 20 out of the way of any obstacle (e.g., furniture) that may be blocking a portion of the AAS panel 20.

In an exemplary embodiment, the controller 80 may include an audio sound mode manager module 84. This module 84 may accept an input on a signal line 88 with respect to the audio sound mode desired. The input 88 may be a traditional type of desired sound to be produced by the AAS 10, such as for example, "mono," "stereo," "5.1," "7.1," etc. However, the input 88 to the audio sound mode manager module 84 may be relatively more complex, such as, for example, an input 88 that defines instances of radiating speaker elements ("RSE's") 32, 36, 40 to be formed of certain sizes, at certain times, at certain angles of sound radiation with respect to the AAS panel 20, and at particular locations on the AAS panel 20.

A speaker "instance" may be considered to be when a single speaker is dynamically created on the AAS panel 20 in embodiments of the present invention. The speaker instance may be thought as being created both physically and logically. Each speaker so created has an origin location in x/y coordinates on the AAS panel 20. Each speaker also has a size DX/DY; that is, how big the speaker is on the AAS panel 20 in units of measurement (e.g., millimeters). Thus, at any instant or moment in time, there are 0 . . . N speaker instances that are created on the AAS panel 20, in accordance with embodiments of the present invention. Of course, with zero ("0") speaker instances at any instant in time, there is no sound being reproduced by the AAS 10 at that instant in time.

The audio sound mode manager module 84 accepts the desired sound mode information on the input 88 and determines the number of speaker instances required, their sizes, and other pertinent information regarding the RSE's to be dynamically created and sends this information to a speaker instance manager module 92 for processing. The desired sound mode information on the input signal line 88 may be provided by some type of computer or processing device, or an audio device such as a receiver (not shown).

In an embodiment of the present invention, the speaker instance manager 92 manages a data structure (e.g., a table) containing a number of speaker instances over a period of time. For each speaker instance, the table lists the x and y coordinates of each speaker instance and the size, DX, DY, of each speaker instance. The speaker instance manager 92 passes through the analog audio signals on the lines 100 to the speaker instance pin manager to calculate the composite voltages applied to the electromagnets for each pin the given speaker instance. This is done in real time, and as the pin voltages vary, the cone moves in and out, producing sound.

The controller 80 may also include an audio mapping modeler module 96 that accepts the analog audio signals on signal lines 100 and assigns those signals 100 to the speaker instance, using the speaker instance manager module 92, as defined when the audio sound mode is setup. For example, if a stereo setup is created, then the audio mapping modeler module 96 assigns the left analog stereo sound signal to the left most speaker element (i.e., one of the RSE's), and assigns the right analog stereo sound signal to the right most speaker (i.e., another one of the RSE's). Similar to the desired sound mode information on the input signal line 88, the analog audio signals on the signal lines 100 may be provided by some type of computer or processing device, or an audio device such as a receiver (not shown). This device would be one that has some knowledge of the audio signals to be presented, and how they should be rendered as sound by the AAS 10. Further, this device may function to associate the speaker pattern to the audio signal.

The speaker instance manager 92 passes through the analog audio signals on the lines 100 to the speaker instance pin manager to calculate the composite voltages applied to the electromagnets for each pin 44 the given speaker instance. This is done in real time, and as the pin voltages vary, the cone moves in and out, producing sound.

The controller 80 may also include a speaker instance pin manager module 104 that may determine the array of driver or actuator pins 44 for a given speaker instance, based on the location, and size of the speaker instance. A driver pin data structure ("DPDS") that maps the addresses of the driver pin area on the AAS panel 20 may be passed to a driver pin controller module 108 for bias and signal processing. For each DPDS that is passed to the driver pin controller module 108, the driver pin controller module 108 may determine in real-time the absolute value of the DC voltage to be applied to each driver pin 44 (FIGS. 3A and 3B) in the DPDS. This information is communicated to the AAS in real-time to drive each created radiating speaker element 32, 36, 40. The voltage for each pin 44 may be determined as a composite voltage that comprises a DC bias component that sets the position of the driver pin and an A/C audio signal component. A collection of driver pins 44 properly biased will form a cone by pulling and stretching the membrane material 24 into a circular (or other shape) shallow cone. As the A/C audio signal is applied to each pin 44, the pin voltage is increased causing the pin 44 to retract further into the electromagnetic actuator, and pulling the membrane material 24 deeper (i.e., to the left in FIGS. 3A and 3B), or the pin voltage is decreased, allowing the pin 44 to relax and the membrane material to return to original shape (i.e., pushed to the right in FIGS. 3A and 3B). This movement of the pins 44 in and out in unison allows the radiating speaker element 32, 36, 40 to push the ambient air, producing sound.

The driver pin controller module 108 may also be used to determine the voltage to be applied to the inputs 76 of the internal damping frame in the embodiment where the internal damping frame 60 comprises strips of electroactive polymer material or where the voltage is applied directly to the selected strips of electroactive polymer material such that the strips become rigid and form a frame 72 around a dynamically formed RSE.

Other embodiments of the present invention may utilize a different type of controller 80 to interface with the AAS 10. For example, a combination of the MPEG-7 interface specification and the spatial placement of objects supported in a VRML stream within an MPEG-7 system may be utilized. Broadly speaking, any controller that expresses the full definition of not only the character of the sound itself, but also the direction and radiation pattern of the sound may be used with embodiments of the AAS 10 of the present invention.

In other embodiments of the analog area speaker 10, relatively small radiating speaker elements may be constructed for use in headphones. This may allow for dynamic reconfiguration of a set of headphones to match the channel characteristics of the audio output. For example, with a standard 2.0 channel signal, only one or two RSE's would need to be formed in each ear cup of the headphones. Also, for a 5.1 surround sound signal, two RSE drivers for each front and rear channel in each ear cup may be formed, along with a bass radiator and center channel RSE's in each ear cup. Other configurations should be apparent in light of these teachings herein.

Other embodiments of the analog area speakers 10 and radiating speaker elements 32, 36, 40 of the present invention support installations on the floor and/or ceiling of a room. As such, the radiation patterns of the AAS's 10 mounted in these locations would need to be coordinated with any wall speakers. That way, all of the AAS's 10 in the installation work properly together, producing correctly phased audio signals for the listeners in the room.

Other embodiments of the present invention involve the dynamic creation of subwoofer speakers. Typical modern subwoofers or low frequency speakers can achieve a relatively flat frequency response using a relatively small speaker as long as the speaker is not overdriven by the input audio signal. It is possible to spatially group together a number of relatively small sized speakers and drive each of them with a relatively reasonable audio signal level. By doing so, one can achieve sound reproduction performance similar to that of a relatively large individual subwoofer. Essentially, a number of relatively small speakers are able to move the same amount of air when reproducing sound as a relatively large single subwoofer.

As described hereinabove with respect to the AAS speaker 10, radiating speaker elements ("RSE's") 32, 36, 40 are created within the AAS panel 20 dynamically at certain locations on the AAS panel 20 and for certain periods of time or "instances." That is, a RSE may be created in a particular location (e.g., as defined by two-dimensional or X/Y coordinates of the panel 20) for an instance and then be removed at that location (i.e., essentially stop being created). By creating one or more of such RSE's at different instances of time and at different locations on the AAS panel 20, the sound that is reproduced by the overall AAS 10 may be perceived as being moved in some direction (e.g., across in one direction) with respect to the AAS panel 20. This configuration can achieve relatively higher directional frequencies. This dynamic speaker creation process also inherently results in a constantly changing set of locations on the speaker panel 20 where no speakers are dynamically created at a particular instance in time. At this instance, a number of dynamic subwoofers may be created at the "no speaker" or unused locations and grouped together to produce an overall single subwoofer in the AAS panel 20. Also, the required power in the audio signal to drive the group of dynamically created subwoofers may be relatively less than the required power in a signal that drives a traditional dedicated subwoofer.

According to other embodiments of the present invention, certain particular scenes in a movie or other type of high definition video presentation that contains audio, such as a television program, may be enhanced such that both the video and audio portions of these particular scenes are enhanced for the viewer/listener of the video presentation. Exemplary scenes include dialog or speaking scenes between two persons. In accordance with specific embodiments of the present invention, both the video and audio associated with a certain scene or segment in the video presentation may be presented to the user on a video display screen and in corresponding audio speakers in an enhanced manner. This may be accomplished by isolating or separating at least two portions of the video stream at a particular instance in time and simultaneously using spatially placed audio speakers that are matched to the images of the isolated video segments at the particular instance in time. The spatially placed audio speakers may also be considered to be isolated as well, wherein the isolated audio is matched as spatially close as possible to the isolated video segments.

Using embodiments of dynamic creation and placement of radiating speaker elements (i.e., audio speakers) described and illustrated hereinabove in greater detail, particular sounds in a video presentation may be isolated from within the video. The isolated sounds may then be paired or tied together in a spatial manner to corresponding isolated regions or segments of the video presentation. The result is relatively improved or enhanced audio emphasis to the isolated video segments.

Figure 6:
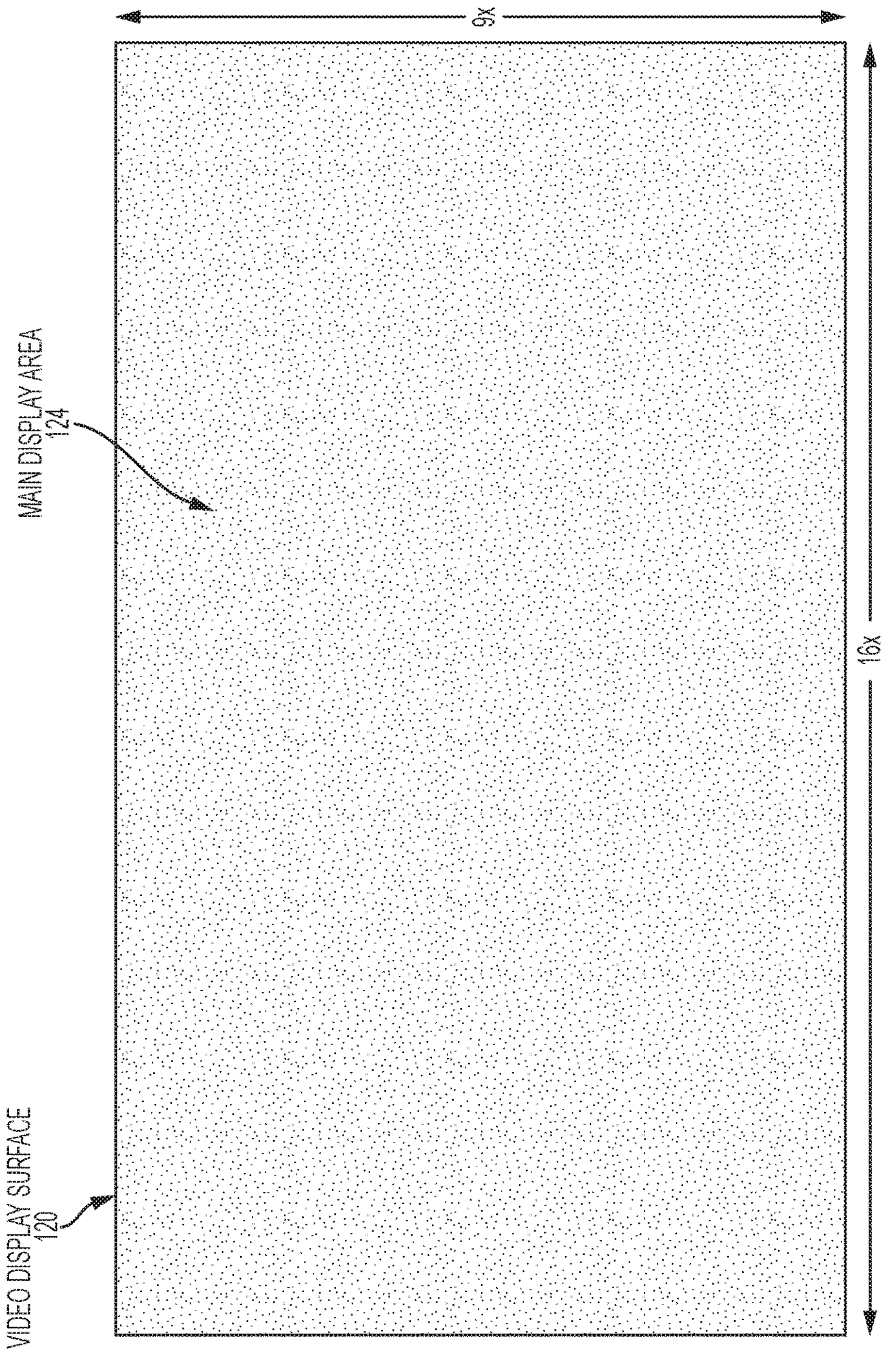
FIG. 6 is a front view of a video display screen having a 16:9 aspect ratio.

Referring to FIG. 6, there illustrated is a typical modern video display surface 120 having a 16:9 aspect ratio (also commonly referred to as "16 by 9," "16×9," "16×" and "9×"). The "16" or "16×" dimension is the horizontal dimension as shown in FIG. 6, while the "9" or "9×" dimension is the vertical dimension as shown in FIG. 6. As can be seen in FIG. 6, the video display surface 120 comprises a single primary or main display area 124 upon which the video presentation is typically displayed. The video display surface 120 with this modern 16:9 aspect ratio may be one that is utilized on televisions and in movie theaters.

In the modern video display configuration of FIG. 6, a plurality of "static" speakers (not shown—discussed hereinabove) may typically be placed at the top and side locations (or other locations) with respect to the display surface 120. In some systems, human dialog or conversation occurring between two or more people in the video content being shown on the display surface 120 may be isolated to an audio channel speaker (not shown), typically known as the center channel, and this center channel speaker is typically placed above the display surface 120 in the center of the display surface 120. That way the sound coming from the center channel speaker may not be blocked by the video display surface 120.

Figure 7:
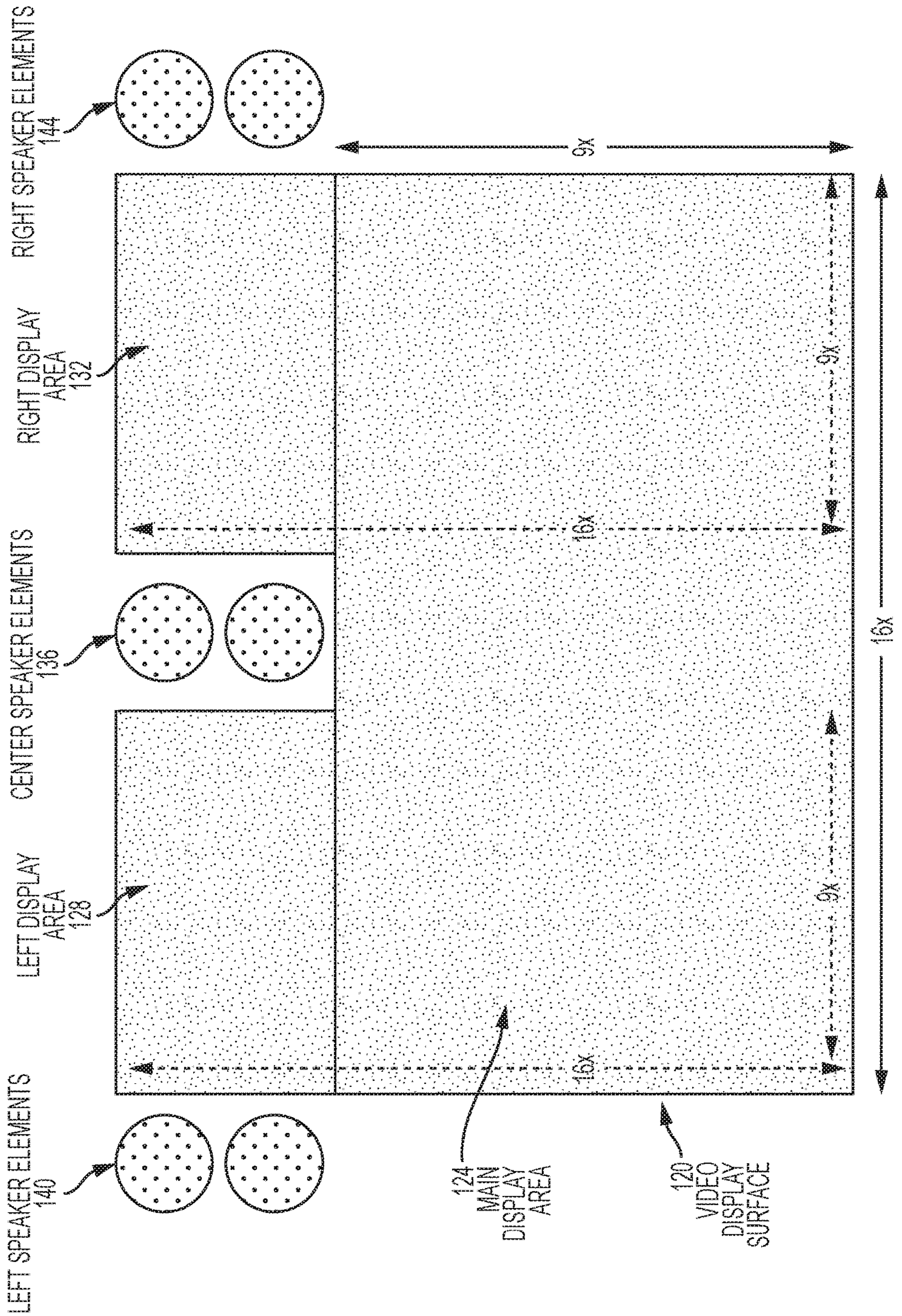
FIG. 7 is a front view of a video display screen and associated audio speaker placement in accordance with an embodiment of the present invention.

Referring to FIG. 7, there illustrated is the video display surface 120 of FIG. 6, including the primary display area 124, and with enhancements to the video display area and to an audio speaker arrangement in accordance with embodiments of the present invention. FIG. 7 shows the primary display area 124 together with two additional display areas 128, 132 (i.e., left display area 128, right display area 132, as viewed in FIG. 7). These display areas 128, 132 are added above the primary display area 124, in accordance with embodiments of the present invention. However, it is to be understood that one or more additional display areas 128, 132 may be added at any location(s) with respect to the primary display area 124. With the addition of these two display areas 128, 132, a single 16:9 horizontal image may be rendered on the primary display area 124. In the alternative, two 9:16 vertical images may be rendered in the primary display area 124 together with a corresponding one of the associated additional display areas 128, 132. Thus, the two additional display areas 128, 132 act as height extensions for the primary display area 124, in accordance with embodiments of the present invention.

FIG. 7 also shows a dynamically created center channel radiating speaker element 136 (e.g., two RSE's 136 in the embodiment shown in FIG. 7) located in a space in between the added height display areas 128, 132. Similarly, FIG. 7 also shows a dynamically created left radiating speaker element 140 (e.g., two RSE's 140 in the embodiment shown in FIG. 7), and a dynamically created right radiating speaker element 144 (e.g., two RSE's 144 in the embodiment shown in FIG. 7). The left and right RSE's 140, 144 are shown as being located next to the corresponding side of the associated added height display areas 128, 132. In an embodiment of the present invention, all of the RSE's 136, 140, 144 may be created within the panel of an analog area speaker similar to the AAS panel 20 of the AAS 10 of FIGS. 1-5. In this embodiment, the panel 20 may be located behind the video display surface 120, and the RSE's 136, 140, 144 may be dynamically created in locations on the AAS panel that are not blocked by the video display surface 120. That way, the sound emanating from the RSE's 136, 140, 144 may be heard clearly.

When two 9:16 vertical video images from within the video presentation are shown on the left side of the primary display area 124 and its added height display area 128 (i.e., the left display area of FIG. 7), and on right side of the primary display area 124 and its added height display area 132 (i.e., the right display area of FIG. 7), the corresponding dynamic radiating speaker elements 140, 144 may be dynamically created and assigned to each of the left display area and the right display area (i.e., relatively close to these display areas 128, 132. This provides for additional audio isolation and separation of the sounds (e.g., typically a dialog or conversation between at least two people) associated with each vertical display.

Figure 8B:
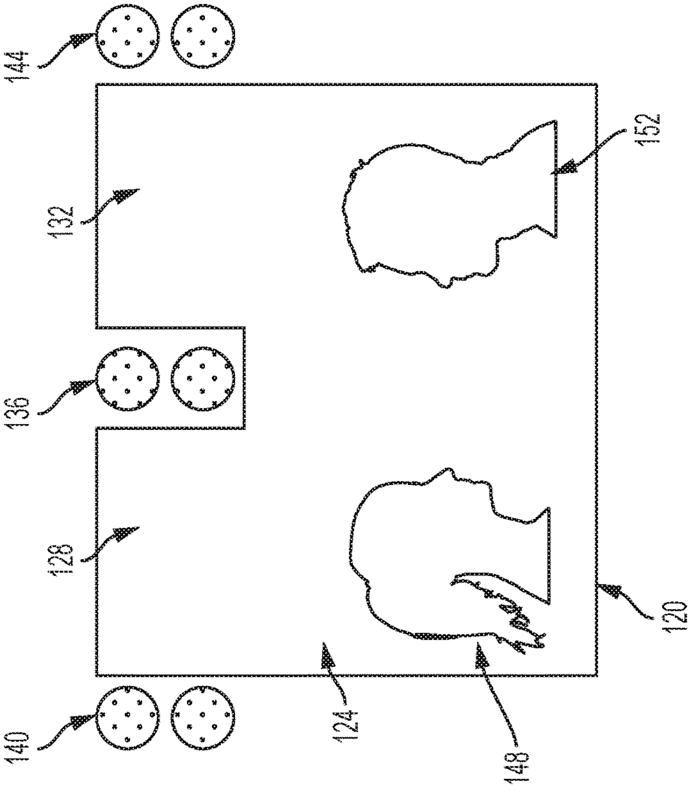
FIGS. 8A and 8B, show two different video display screens and associated audio speaker placements in accordance with embodiments of the present invention.
Figure 8A:
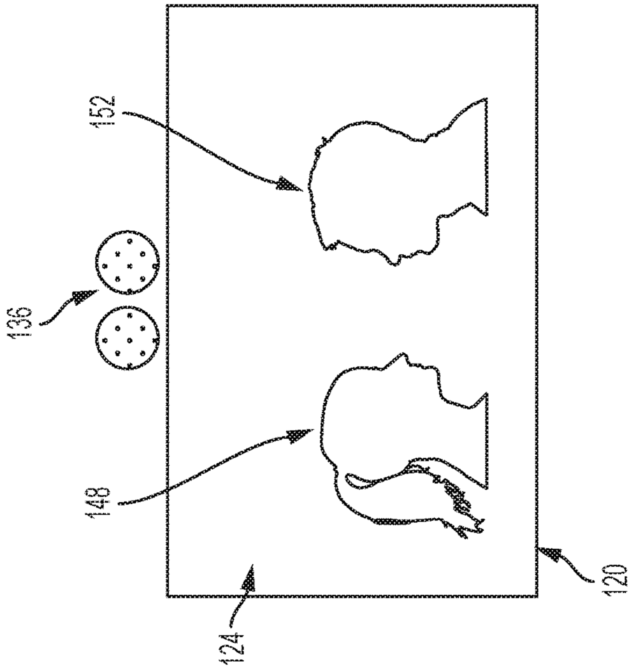

Refer now to FIG. 8, which includes FIGS. 8A and 8B. In the embodiment of FIG. 8A, the 16:9 primary display area 124 is used to show the entire video presentation (e.g., a movie or a television program). All of the audio with respect to the dialog or conversation between the two people 148, 152 shown in that figure emanates or originates from the center speaker array 136. The result is there is little or no separation between the voices of the two speakers 148, 152 perceived by a person watching the video and listening to the associated audio. There is also no separation or isolation of the video of that conversation between the two people 148, 152.

In contrast, in the two person dialog scene in the embodiment of FIG. 8B, the two people 148, 152 in the video are isolated from a video perspective in that each person is assigned to one of the corresponding portions of the primary display area 124 together with the associated one of the added display areas 128, 132. That is, each person 148, 152 is displayed within a corresponding one of the 9:16 display areas, as previously described hereinabove with respect to FIG. 7. This video isolation in accordance with an embodiment of the present invention results in the image of each of the two people 148, 152 being approximately twenty percent (20%) larger than the images of the same two people 148, 152 in FIG. 8A. The embodiment of FIG. 8B may yield an improvement in the level of detail as compared to the embodiment of FIG. 8A. Thus, this embodiment of the present invention represents an alternative to simply scaling each of the two people in the dialog scene from the video in the existing video stream.

If relatively greater resolution versions of the presentation are available, these can be projected instead of the scaled versions of the two people in the dialog scene in the video. This way, additional detail may be realized in the higher resolution content integrated into the overall video display. Also, embodiments of the present invention are not limited to isolation of dialog of speaking scenes within a video presentation. Other types of scenes within a video presentation may be both video isolated and audio isolated.

Analyzing the embodiments of FIGS. 8A and 8B, in contrast, in the embodiment of FIG. 8B, for the person speaking on the left in that figure, the voice audio is made to emanate from the left speakers, which are the speakers associated relatively the closest to that person. Conversely, for the person speaking on the right side in that figure, the voice audio is made to emanate from the left speakers, which are the speakers associated relatively the closest to that person. This provides for a relatively large amount of stereophonic separation of the audio dialog between the two people speaking in FIG. 8B.

Further, in video viewing environments in which multiple video projectors are able to project specific portions of the overall video in a video display area, it can be seen from the foregoing that embodiments of the present invention are able to provide for flexibility in the projection of video and associated audio as needed to enhance the spatial effect of the audio together with the video.

It can be seen from the foregoing that embodiments of the present invention allow for relatively greater focus, both visually and audibly, to certain portions of the overall video/audio content presented in a movie or television program. The enhancements provided are two-fold. A first enhancement is the video enhancement in which a video screen is created as shown in FIG. 8B. Normal video content is by default displayed on the standard 16:9 portion of the display. At specific portions while the video is playing, the video stream may be split into two parts in which the left part of the video (with reference to FIG. 8B) is shown on the left side 9:16 extended display screen and the right part of the video is shown on the right side 9:16 extended display screen. A typical application for this embodiment is in dialog or conversation scenes in the video between at least two people 148, 152, in which each person is shown on his/her own extended display screen. By splitting or isolating the video in this manner, each person 148, 152 is shown approximately 20% larger in size, which brings a relatively greater degree of focus to each person 148, 152 for the viewers of the video.

A second enhancement is to isolate the audio portion of the event (e.g., movie, television show, etc.) being viewed at the instance in time. The AAS 10 of embodiments of the present invention allows for the dynamic creation of radiating speaker elements at precise or isolated positions where desired, such as for example when a person in the video is speaking at an instance in time.

The video and audio enhancements of embodiments of the present invention may be carried out through use of manual encoding. In this embodiment, a content creator that creates the video may encode how the content should be enhanced by embedding this information into the video stream and the audio stream. For example, the content creator may specify in which video scenes the split screen 9:16 extended video displays of FIG. 8B should be utilized. The content creator can also define which audio channel should be emitted from which location on the AAS speaker panel 20. This may be carried out in an embodiment using coordinates to define a location on the AAS speaker panel 20 where one or more radiating speaker elements are to be formed.

In the alternative, the video and audio enhancements of embodiments of the present invention may be carried out through use of software encoding. In this embodiment, software can define how the audio and video enhancements may be applied. Image analysis can be used to identify situations where there are multiple audio sources on the video screen, such as when two people are talking. This enables the video enhancement. Speaker recognition can be used to identify which person is speaking at any instance in time by analyzing the center channel audio content, and then determine the appropriate location on the AAS panel 20 in which to dynamically create a radiating speaker element 32, 36, 40 from which the audio emanates.

Figure 9A:
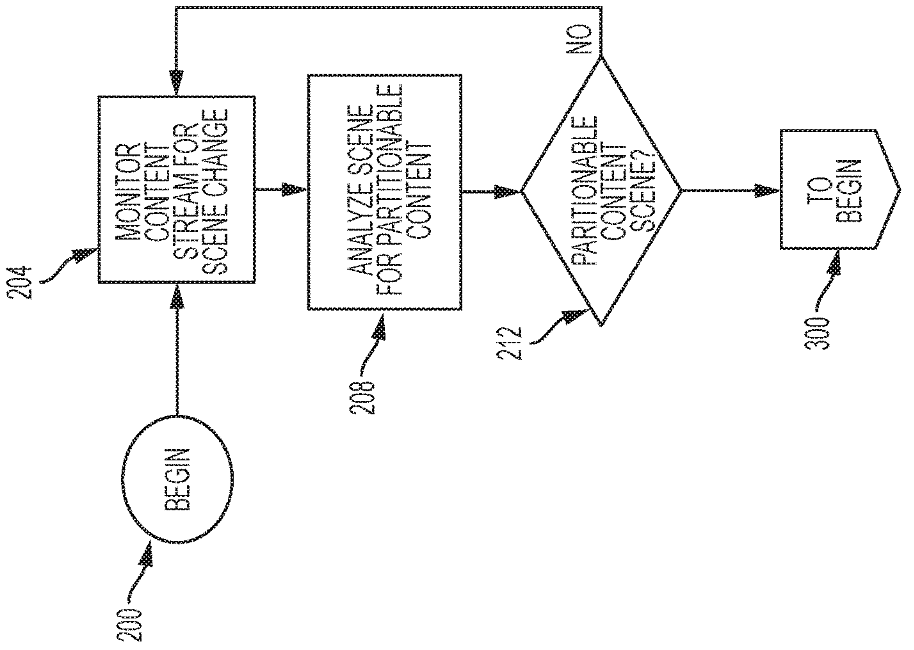
FIGS. 9A and 9B together illustrate a flow chart of a method of determining the content of a video scene and isolating video and audio portions thereof in accordance with an embodiment of the present invention.
Figure 9B:
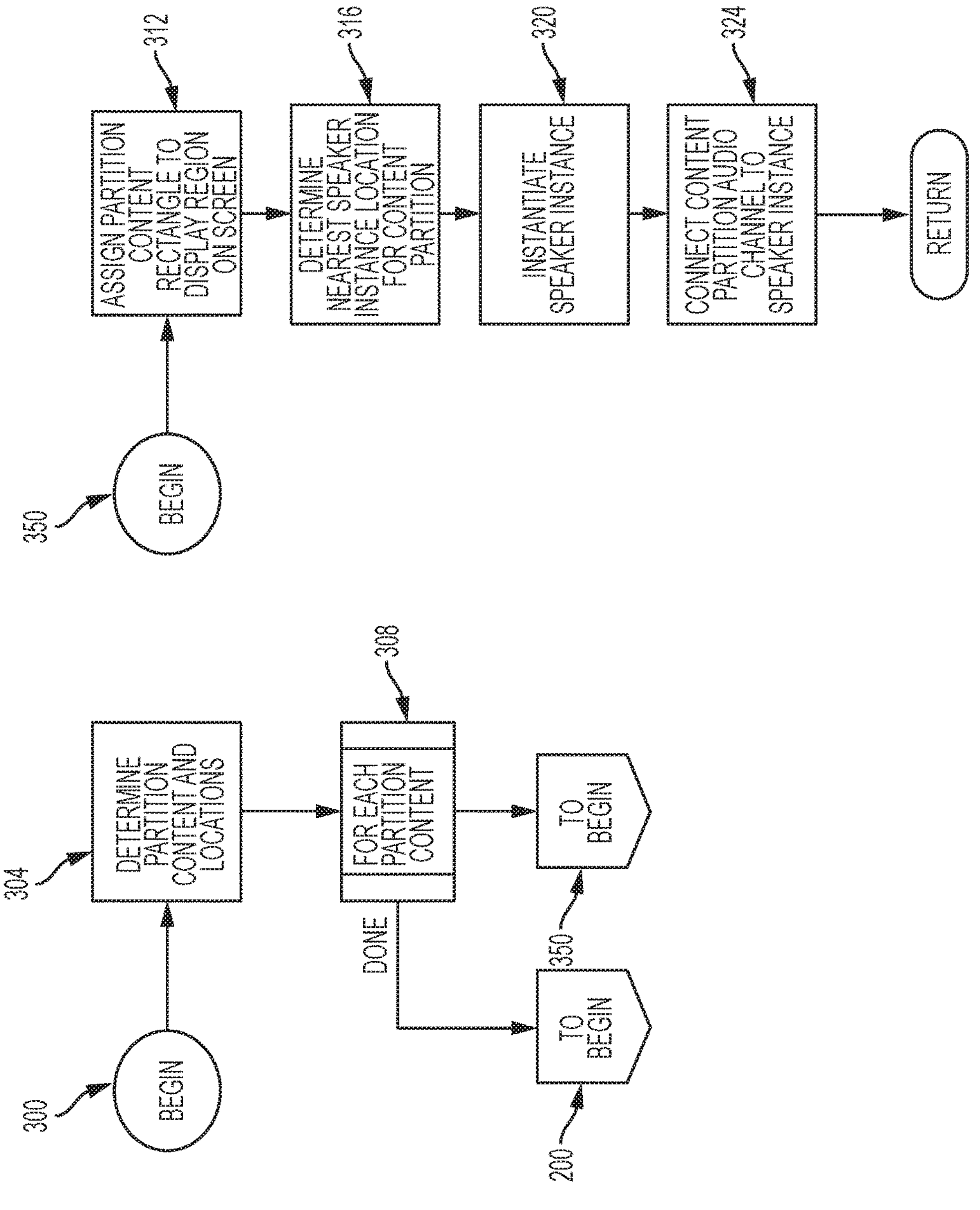

FIGS. 9A and 9B together illustrate a flow chart of a method of determining the content of a video scene and isolating video and audio portions thereof in accordance with an embodiment of the present invention. More specifically, automated scene detection and processing may be used to determine the content of a video scene, and the video scene content may be partitioned into separate displayable regions on the display screen, with dynamic speaker instances created and located near the video partition content. The speaker instances emit the audio content associated with the video partition content.

After a begin step 200 in FIG. 9A, a step 204 is executed in which the content of the video stream is monitored for video scene changes. A scene change may be indicated either with a scene change marker in the metadata within the video stream content, or by analyzing the video stream content directly for large visual content changes. The metadata approach is relatively more accurate, and is also relatively less compute intensive. Monitoring the video stream allows the system to work with any video stream.

The new scene resulting from the scene change determination may then be analyzed in a step 208 for partitionable content. If the scene can be partitioned into sub scenes with localized audio as determined in the step 212, then further processing may be carried out in the method. Otherwise the method returns to the step 204 of monitoring the video stream for the next scene change.

If the scene can be partitioned into sub scenes with localized audio as determined in the step 212, then the method branches to a begin step 300 and then a step 304 is executed in which the locations in the video stream of each partition content are determined. This may be memorized as a source rectangular area. Associated with the source partition rectangle is an audio channel. This association may be determined, for example, either by metadata, by associating an actor with a particular voice, or by analyzing lip movements. Then in a step 308 an array of partitions which include the partition source rectangle and the audio channel are kept to use in setting up the display screen, and rendering the audio.

Following a begin step 350, a step 312 is executed is which the partition content is assigned to the display region on the video screen. This may be carried out for example by mapping the partition source rectangle to a new display location on the display screen. This mapping may include scaling up a source partition to a slightly larger display size, for visual emphasis. Once the content partition is assigned a display location, the video content is displayed on the display screen.

A speaker location may then be determined in a step 316 for the dynamic creation of a radiating speaker element. The size of the speaker may also be also determined, based on the available region around the partitioned video content for the partition display. The speaker instance is instantiated in a step 320, and the audio channel that is associated with the partitioned video content is connected to the speaker instance in a step 324. The speaker then begins to emit the audio for the partitioned video content.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:

a video display screen configured to display selected regions of video content on a main portion of the video display screen and on one or more extended portions of the video display screen, wherein the one or more extended portions of the video display screen are not overlapping with the main portion of the video display screen; and an audio system configured to dynamically create a plurality of sound radiating speaker elements at a corresponding plurality of spatially selected locations with respect to the displayed selected regions of the video content;

wherein each one of the plurality of sound radiating speaker elements includes:

an outer frame;

a stretchable membrane material enclosed at least in part by the outer frame;

a plurality of movable actuator devices disposed perpendicular to and on one side of the membrane material, each one of the actuator devices being connected to one side of the membrane material; and a controller configured to control creation of one or more radiating speaker elements at a controller selected instance in time and at corresponding one or more locations at the membrane material by controlling movement of a selected one or more of the movable actuator devices.

2. The system of claim 1, wherein at least one of the selected regions of the video content includes a speaking dialog between at least two persons.

3. The system of claim 2, wherein the video display screen is configured to display one of the at least two persons on a portion of the main portion of the video display screen and also on one of the one or more extended portions of the video display screen.

4. The system of claim 3, wherein the audio system is configured to dynamically create at least one of the plurality of sound radiating speaker elements at one of the corresponding plurality of spatially selected locations with respect to the displayed at least one of the at least two persons.

5. The system of claim 1, wherein the movement of a selected one or more of the movable actuator devices causes a portion of the membrane material connected to the one or more of the movable actuator devices undergoing movement to form a speaker cone that produces sound in response to an applied audio signal to the selected one or more of the movable actuator devices undergoing movement.

6. The system of claim 1, wherein the audio system is configured to dynamically create the plurality of sound radiating speaker elements during any one particular instance in time at the corresponding plurality of spatially selected locations with respect to the displayed selected regions of the video content, and wherein the audio system is configured to dynamically create one or more subwoofer sound radiating speaker elements during the any one particular instance in time at one or more spatially selected more locations where the audio system is not dynamically creating the plurality of sound radiating speaker elements, wherein the dynamically created one or more subwoofer sound radiating speaker elements are grouped together and driven with a common audio signal.

7. A method comprising:

providing a video display screen configured to display selected regions of video content on a main portion of the video display screen and on one or more extended portions of the video display screen, wherein the one or more extended portions of the video display screen are not overlapping with the main portion of the video display screen; and providing an audio system configured to dynamically create a plurality of sound radiating speaker elements at a corresponding plurality of spatially selected locations with respect to the displayed selected regions of the video content;

wherein each one of the plurality of sound radiating speaker elements includes:

an outer frame;

a stretchable membrane material enclosed at least in part by the outer frame;

a plurality of movable actuator devices disposed perpendicular to and on one side of the membrane material, each one of the actuator devices being connected to one side of the membrane material; and a controller configured to control creation of one or more radiating speaker elements at a controller selected instance in time and at corresponding one or more locations at the membrane material by controlling movement of a selected one or more of the movable actuator devices.

8. The method of claim 7, wherein at least one of the selected regions of the video content includes a speaking dialog between at least two persons.

9. The method of claim 8, wherein the video display screen is configured to display one of the at least two persons on a portion of the main portion of the video display screen and also on one of the one or more extended portions of the video display screen.

10. The method of claim 9, wherein the audio system is configured to dynamically create at least one of the plurality of sound radiating speaker elements at one of the corresponding plurality of spatially selected locations with respect to the displayed at least one of the at least two persons.

11. The method of claim 7, wherein the movement of a selected one or more of the movable actuator devices causes a portion of the membrane material connected to the one or more of the movable actuator devices undergoing movement to form a speaker cone that produces sound in response to an applied audio signal to the selected one or more of the movable actuator devices undergoing movement.

12. The method of claim 7, wherein the audio system is configured to dynamically create the plurality of sound radiating speaker elements during any one particular instance in time at the corresponding plurality of spatially selected locations with respect to the displayed selected regions of the video content, and wherein the audio system is configured to dynamically create one or more subwoofer sound radiating speaker elements during the any one particular instance in time at one or more spatially selected locations where the audio system is not dynamically creating the plurality of sound radiating speaker elements, wherein the dynamically created one or more subwoofer sound radiating speaker elements are grouped together and driven with a common audio signal.

13. A system comprising:

a video display screen configured to display a selected region of video content on a main portion of the video display screen and at least one extended portion of the video display screen, wherein the at least one extended portion of the video display screen is not overlapping with the main portion of the video display screen; and an audio subsystem configured to dynamically create a plurality of sound radiating speaker elements at a corresponding plurality of spatially selected locations with respect to the displayed selected region of the video content;

wherein each one of the plurality of sound radiating speaker elements includes:

an outer frame;

a stretchable membrane material enclosed at least in part by the outer frame;

a plurality of movable actuator devices disposed perpendicular to and on one side of the membrane material, each one of the actuator devices being connected to one side of the membrane material; and a controller configured to control creation of one or more radiating speaker elements at a controller selected instance in time and at corresponding one or more locations at the membrane material by controlling movement of a selected one or more of the movable actuator devices.

14. The system of claim 13, wherein the selected region of the video content includes a speaking dialog between at least two persons.

15. The system of claim 14, wherein the video display screen is configured to display one of the at least two persons on a portion of the main portion of the video display screen and also on the extended portion of the video display screen.

16. The system of claim 15, wherein the audio subsystem is configured to dynamically create the plurality of sound radiating speaker elements at the corresponding plurality of spatially selected locations with respect to the displayed at least one of the at least two persons.

17. The system of claim 13, wherein the movement of a selected one or more of the movable actuator devices causes a portion of the membrane material connected to the one or more of the movable actuator devices undergoing movement to form a speaker cone that produces sound in response to an applied audio signal to the selected one or more of the movable actuator devices undergoing movement.

* * * * *